United States Patent
Uliveto et al.

(10) Patent No.: US 9,850,179 B2
(45) Date of Patent: Dec. 26, 2017

(54) GRANULAR HUMATE FOR SPRAY APPLICATION AND PROCESS OF MAKING SAME

(71) Applicant: The Andersons, Inc., Maumee, OH (US)

(72) Inventors: John Uliveto, Findlay, OH (US); Chris Taylor, Maumee, OH (US); Eric Dearth, Maumee, OH (US)

(73) Assignee: The Andersons, Inc., Maumee, OH (US)

( * ) Notice: Subject to any disclaimer, the term of this patent is extended or adjusted under 35 U.S.C. 154(b) by 203 days.

(21) Appl. No.: 14/845,757

(22) Filed: Sep. 4, 2015

(65) Prior Publication Data

US 2016/0068451 A1    Mar. 10, 2016

Related U.S. Application Data

(60) Provisional application No. 62/045,791, filed on Sep. 4, 2014.

(51) Int. Cl.
*C05F 11/02* (2006.01)
*C05G 3/00* (2006.01)

(52) U.S. Cl.
CPC ............ *C05G 3/0058* (2013.01); *C05F 11/02* (2013.01); *C05G 3/0088* (2013.01)

(58) Field of Classification Search
None
See application file for complete search history.

(56) References Cited

U.S. PATENT DOCUMENTS 3,111,404 A * 11/1963 Karcher .................. C05F 11/02
                                                          71/24
3,307,934 A *  3/1967 Palmer ..................... C05B 1/04
                                                         23/313 R (Continued)

FOREIGN PATENT DOCUMENTS

CN    2481715 Y    3/2002
CN    102001898 A  4/2011

(Continued)

OTHER PUBLICATIONS

Humic Growth Solutions, Diamond-Grow Organic 100% Soluble Spray Dried Powder—95% Humic Acid, 112 Badger Park Drive, Jacksonville, Florida 32259, info@humicgrowthsolutions.com.

*Primary Examiner* — Wayne Langel
(74) *Attorney, Agent, or Firm* — Avery N. Goldstein; Blue Filament Law PLLC (57) ABSTRACT

A granularized sulfonated humate powder material is provided that includes a sulfonated cationic humate composed of at least one of humic acid, fulvic acid, or a combination thereof in the form of granules of from 0.1 to 6 millimeters in size. The humate powder material is water soluble with limited dusting and the ability to form a concentrated solution for application. A process of formulating the sulfonated potassium humate powder in granular form includes a lignin or lignosulfonate being metered into a powder of sulfonated potassium humate to allow for granulation without a solubilizing the powder by matching a lignin particle size to a particle sizing of said powder. The lignin or lignosulfonate and the powder are mixed into the granular form with a granule size of 0.1 to 6 millimeters.

5 Claims, 5 Drawing Sheets (56) References Cited

U.S. PATENT DOCUMENTS

| | | | | |
|---|---|---|---|---|
| 3,352,902 | A * | 11/1967 | Moschopedis | C08H 99/00 106/18.32 |
| 3,544,296 | A * | 12/1970 | Karcher | C05F 11/00 71/24 |
| 3,617,237 | A * | 11/1971 | Nagasawa | B01J 2/00 23/313 R |
| 3,770,411 | A * | 11/1973 | Chambers | C05B 7/00 71/24 |
| 4,069,034 | A * | 1/1978 | Hoover | C05B 7/00 23/300 |
| 4,319,041 | A | 3/1982 | Goff | |
| 4,502,868 | A | 3/1985 | Yaghmaie et al. | |
| 4,743,287 | A * | 5/1988 | Robinson | C05F 3/00 71/12 |
| 5,026,416 | A * | 6/1991 | Alexander | C05F 11/02 71/24 |
| 5,034,045 | A * | 7/1991 | Alexander | C05F 11/02 71/24 |
| 5,354,350 | A * | 10/1994 | Moore | C05B 7/00 210/411 |
| 5,538,530 | A * | 7/1996 | Heaton | A62D 3/35 149/124 |
| 5,663,425 | A | 9/1997 | Detroit et al. | |
| 5,698,001 | A * | 12/1997 | Keenportz | C05D 9/00 71/24 |
| 6,251,826 | B1 * | 6/2001 | Kulik | C05F 11/00 47/DIG. 10 |
| 6,783,567 | B1 * | 8/2004 | Waters | C05D 9/00 71/24 |
| 6,878,179 | B2 * | 4/2005 | Porubcan | C05B 1/00 71/12 |
| 7,867,947 | B1 * | 1/2011 | Devic | A01N 25/12 504/101 |
| 8,435,321 | B2 | 5/2013 | Lynch et al. | |
| 8,636,822 | B1 * | 1/2014 | Boyce | C05B 7/00 71/11 |
| 9,139,485 | B2 * | 9/2015 | Haruna | C05C 9/00 |
| 2003/0101785 | A1 * | 6/2003 | Jia | C05B 15/00 71/24 |
| 2005/0039509 | A1 * | 2/2005 | Muma | C05B 7/00 71/24 |
| 2008/0221314 | A1 * | 9/2008 | Freire | C05D 9/00 536/22.1 |
| 2010/0251790 | A1 * | 10/2010 | Van Rooijen | C05F 11/04 71/24 |
| 2011/0077155 | A1 * | 3/2011 | Goodwin | A01N 25/08 504/101 |
| 2011/0190124 | A1 * | 8/2011 | Terenzio | C05G 3/0064 504/101 |
| 2012/0047974 | A1 * | 3/2012 | Huang | C05F 11/00 71/8 |
| 2013/0227998 | A1 | 9/2013 | Copplestone | |
| 2015/0152017 | A1 * | 6/2015 | Schumski | C05G 3/0047 71/24 |

FOREIGN PATENT DOCUMENTS

| | | |
|---|---|---|
| CN | 103121871 A | 5/2013 |
| CN | 103214303 A | 7/2013 |
| KR | 20020025006 A | 4/2002 |
| RU | 2191798 C1 | 10/2002 |

* cited by examiner

GRANULAR HUMATE FOR SPRAY APPLICATION AND PROCESS OF MAKING SAME

RELATED APPLICATIONS

This application is a non-provisional application that claims priority benefit of U.S. Provisional application Ser. No. 62/045,791; filed 4 Sep. 2014; the contents of which are hereby incorporated by reference.

FIELD OF THE INVENTION

The present invention, in general, relates to soluble humates and fulvates and a process for making same, and in particular to a granular product that has limited dusting and is amenable to delivery via a spray applicator or liquid application, such as drip irrigation.

BACKGROUND OF THE INVENTION

The humic and fulvic acids in a dry soluble powder act as natural chelating agents binding to nutrients in the soil. Plant roots absorb these humic acid nutrient compounds effectively increasing the efficiency of plants' uptake of nutrients and decreasing nutrient losses caused by leaching. In combination with fertilization, humic and fulvic acids foster efficient use of a fertilization program and may even reduce the amount of nutrients applied. Humic and fulvic acids also contribute to improving soil quality, texture, water holding capacity (retention) and sustainability, while breaking down clay lattices and reducing sodium build up in soils. By using a dry soluble product, a user can make small liquid batches when and where needed, transportation, storage and handling are simpler and cost efficient.

Sulfonated potassium humate powder is inherently highly soluble in most aqueous liquids over a range of pH ranges, and this humate is also dusty to handle as a powder—which are key factors for humic acid agronomic performance, but also lead to other physical and handling restrictions that have limited the marketplace use and acceptance of this product. This high solubility has also been a detriment in the ability to make sulfonated potassium humate into a granular form. In addition, existing granular potassium humates have limitations with respect to solubility in fertilizer solutions, especially acidic solutions. Furthermore, existing liquid humate solutions and formulations are limited in humate concentration levels, resulting in the inefficient transport of such products.

Thus, there exists a need for a sulfonated humate that allow for ease of handling, storage as a low dust granule; and application of the granular form either in particle or liquid form.

SUMMARY OF THE INVENTION

A granularized sulfonated humate powder material is provided that includes a sulfonated cationic humate composed of at least one of humic acid, fulvic acid, or a combination thereof in the form of granules of from 0.1 to 6 millimeters in size. The humate powder material is water soluble with limited dusting and the ability to form a concentrated solution for application.

A process of formulating the sulfonated potassium humate powder in granular form includes a lignin or lignosulfonate being metered into a powder of sulfonated potassium humate to allow for granulation without a solubilizing the powder by matching a lignin particle size to a particle sizing of said powder. The lignin or lignosulfonate and the powder are mixed into the granular form with a granule size of 0.1 to 6 millimeters.

A crop can be fertilized with the powder by dissolving or suspending the material in water or an aqueous fertilizer to form a lyophilic dispersion or solution. The Resulting dispersion or solution is then applied through a tape emitter for drip irrigation applications, tank mixes, and fertigation equipment to fertilize the crop without the clogging that has been common with conventional humates.

BRIEF DESCRIPTION OF THE DRAWINGS

The present invention is further detailed with respect to the following drawings that are intended to show certain aspects of the present invention, but should not be construed as a limit on the practice of the present invention.

DETAILED DESCRIPTION OF THE PREFERRED EMBODIMENTS

The present invention has utility as a humate product that has the attributes of being a water soluble, granule with limited dusting and the ability to form a concentrated solution for ease of delivery. Sulfonated humate is processed into granules with limited processing usage of water to form such granules.

As used herein, sulfonated humate is intended to defined a granular substance composed of humic acid, fulvic acid, of a combination thereof that have been reacted to yield a granular substance having a sulfonic sulfur content greater than about 5% by total weight. A process for producing sulfonated humate is detailed in U.S. Pat. No. 5,663,425, the contents of which are hereby incorporated by reference. It is appreciated that a variety of alkali metal cations, ammonium, and alkali earth cations are operative with sulfonated humates.

As used herein, screen sieve size, unless otherwise noted, refers to U.S. standard sieve sizes.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An inventive form of sulfonated humate powder in granular form is provided that solves the solubility and dust problems that have been encountered previously, as well as problems associated with dry blending, and inefficiencies of handling liquids, yet still allows the inventive sulfonated potassium humate powder product to be applied as a aqueous liquid, for those benefits that the final liquid application provides. In specific embodiments, the dust suppression in an inventive formulation comes from the addition of a binder to form a hard particle that does not break into dust forming fragments during manufacture or transport. Binders operative herein include carbohydrates such as monosaccharides, disaccharides, oligosaccharides and polysaccharides; proteins; lipids; glycolipid; glycoprotein; lipoprotein; and combinations and derivatives of these. Specific carbohydrate binders illustratively include dextrose, glucose, mannose, fructose, galactose, sucrose, lactose, maltose, xylose, arabinose, trehalose and mixtures thereof such as corn syrup; celluloses such as carboxymethylcellulose, ethylcellulose, hydroxyethylcellulose, hydroxy-methylethylcellulose, hydroxyethylpropylcellulose, methylhydroxyethyl-cellulose, methylcellulose; starches such as amylose, seagel, starch acetates, starch hydroxyethyl ethers, ionic starches, long-chain alkyl starches, dextrins, amine starches, phosphates starches, and dialdehyde starches; plant starches such as corn starch and potato starch; other carbohydrates such as pectin, amylopectin, xylan, glycogen, agar, alginic acid, phycocolloids, chitin, gum arabic, guar gum, gum karaya, gum tragacanth and locust bean gum; complex organic substances such as lignin and nitrolignin; derivatives of lignin such as lignosulfonate salts including calcium lignosulfonate, sodium lignosulfonate, and ammonium lignosulfonate. Suitable protein binders illustratively include soy extract, zein, protamine, collagen, and casein. Binders operative herein also include synthetic organic polymers capable of promoting or producing cohesion of methylene urea oligomer fines and these illustratively include ethylene oxide polymers, polyacrylamides, polyacrylates, polyvinyl pyrrolidone, polyethylene glycol, polyvinyl alcohol, polyvinylmethyl ether, polyvinyl acrylates, polylactic acid, and latex. In certain inventive embodiments, the binder is calcium lignosulfonate, molasses, a liquid corn starch, a liquid corn syrup or a combination thereof.

However, the hardness of the particle to prevent dusting is balanced against forming the granules in a way that the highly soluble sulfonated humate does not dissolve and form an unworkable slurry. The resulting granules dissolve and can pass through tiny apertures in irrigation and spray equipment (including filter screens) to avoid plugging spray nozzles.

In certain inventive embodiments, the base material for the humic acid may be based on the sulfonated powder as provided. Unique process and formulation characteristics for the inventive sulfonated potassium humate powder in granular form include: atomization and rate of lignin to allow for granulation without solubilizing powder, where the key is matching lignin (or a binder such as calcium lignosulfonate) particle size to that of powder particle sizing without inducing solubility of the sulfonated humate powder by overwhelming the powder, causing the powder to lose its dry nature and go into solution, or compromising the ability of the sulfonated humate to granulate or stay in granulated form; limiting to no binder addition thereby achieving an energy savings; having a high sensitivity to heat/energy/shear pressure common to most granulation processes to avoid "plasticizing" the material—shugi mixers addresses this with respect to flexible containment walls (avoids buildup), vertical agglomeration process, as well as containment of any liquid binder within the granule and avoiding a wet outer surface; and an ability to maintain a high humic concentration, without diluting down by addition of inerts or other fertilizer materials. The ability to produce the inventive humate powder in granular form is not found in other existing granulation processes which do not have enough forgiveness or flexibility to accommodate continuous production, and are plagued with frequent cleanings and excessive downtime In a specific embodiment of the inventive granularized sulfonated humate powder there is a 70% humic acid content, 14% soluble potassium, and 6% sulfur, with a solubility of greater than 98% of the granules by weight to form a thermodynamically stable solution or lyophilic colloidal suspension within 5 minutes in water or a fertilizer solution with slight agitation; and in contrast to a kinetically unstable suspension. The resulting powder also has the attribute of being resistant to attrition of 50% as measured by internal methodology to the Assignee of this invention "WI-LABL0053" "Resistance to attrition of granular carriers and granular pesticides" or alternatively that cited in U.S. Pat. No. 8,435,321.

Inventive sulfonated humate granules are soluble from pH 2 to 12, in contrast to conventional granular potassium humate products that have poor solubility in fertilizer solutions, especially acidic solutions. Also, other methods for producing humic acids have also failed to achieve acid soluble products from humic acid bearing ores involve extraction with alkali, as described in U.S. Pat. No. 4,319,041; or sulfur dioxide described in U.S. Pat. No. 4,502,868; or sulfuric acid or sodium sulfite.

Inventive sulfonated humate granules are formed in a wide range of densities ranging from 25 lbs/cubic ft. to 70 lbs/cubic ft. This range is density is readily achieved by flashing drying to achieve a porous, low density inventive granule or a compaction process to form high density granules within this range. The resultant granular product has water content of less than 10% total weight percent, and in certain inventive embodiments of between 0.2 and 6 total weight percent. In a compaction process of forming inventive granules, water content is between 3% to 6%. The sulfonated humate granules have a size of between 0.1 mm and 6.0 mm; and in other embodiments, between 0.3 and 3 mm. As a result, an inventive granule product limits the transport of water, as compared to liquid finished goods, thereby reducing freight environmental and energy impact. In addition, an inventive product has an extended shelf storage life compared to liquid finished goods that avoids freezing and bacterial growth in storage.

The inventive granulized sulfonated potassium humate has unique application characteristics in that the inventive humic product originates as a granule, but when mixed into water and/or fertilizer solutions it is able to be applied through tape emitter for drip irrigation applications, tank mixes, fertigation equipment, etc., as a result of forming a humate solution in not only water, but also fertilizer solutions with pH values from 2 to 12. The soluble nature of the inventive sulfonated humate granules precludes clogging of small apertures used in drip irrigation piping, spray nozzle and the like. It is of note that a limitation of conventional potassium humate granules is that these granules are somewhat limited for usage with the afore-mentioned types of field application equipment if the granules are applied in water solution or suspension, and are most limited if the conventional potassium humate granules are applied by fertilizer solution mixes.

Benefits provided to the user of the inventive granulized sulfonated potassium humate include allowing users to handle a granular product and avoid the hazards of powder handling, yet maintain spray applications traditionally limited to powders and liquids. A further benefit of the inventive granular humate granules are a reduction in warehouse/storage requirements and footprint compared to liquid products. An additional advantage of the inventive granular humate granules is the ability to combine fertilizer and the humate application to reduce the overall number of applications, required labor, etc.

Example 1

Leonardite with a mean particle size of less than 3 mm is mixed with a minimum of 16% (w:w) formaldehyde and 33% (w:w) sodium meta-bisuifite, adjusting the pH of said mixture to 10-11 with sodium hydroxide and reacting the pH adjusted mixture at 160° C. for 90 minutes under sufficient pressure to prevent evaporation of water. The solids content of the mixture during this process is 25% by weight. After reaction, the undissolved solids present in the mixture are separated from sulfoalkylated humic acid solution by filtration, settling and/or centrifugation. Upon completion of the process, a liquid product is formed which is a minimum of 20% sulfoalkylated humic acid in aqueous solution. The pH of said product is between 9.0 and 10.0, the sulfonic sulfur content is greater than 5%, the viscosity is 60 cps and the precipitation pH (i.e., the pH at which the material becomes insoluble and forms a precipitate) is below pH 0.5. The resulting material is collected as a dry powder.

Example 2

Figure 1:
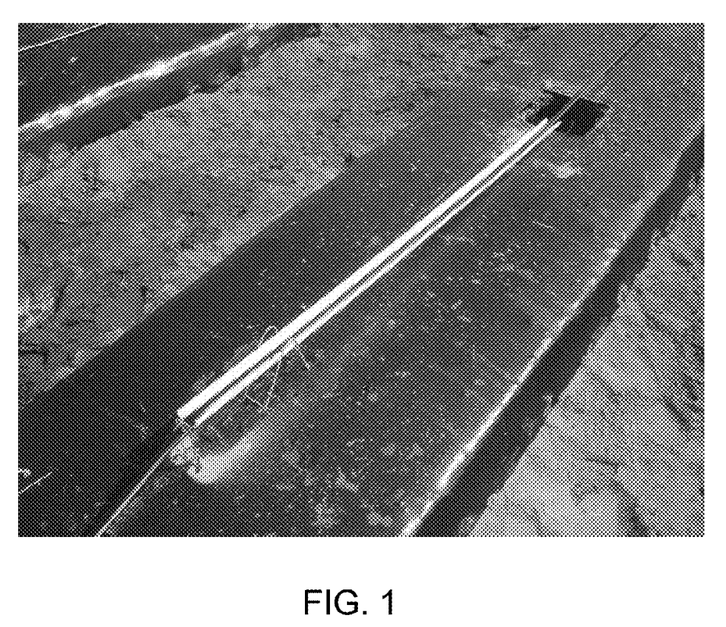
FIG. 1 is a photograph of a drip tape inside a 5-foot inclined PVC channel for collecting flow.

An evaluation of the inventive sulfonated humate granules product marketed by the Assignee as UltraMate SG humic acid for drip irrigation injection was conducted. The objective of the test was to determine the effects on drip emitter flow rate over a 50-day period
Materials and Method:

The experiment was conducted at the University of Florida Plant Science Research and Education Unit in Citra, Fla., during March through April, 2014. Raised beds were formed and covered with black polyethylene mulch. There were 4 beds each 100 feet in length (two beds for humate injection and two beds for plain water). Drip irrigation tubing was placed on the surface of the bed and connected to the pressurized irrigation system (12-15 psi) and a drip irrigation injection system. The drip tubing had emitters on 8-inch spacing. Six 5-ft sections of tubing from each of two beds (12 observations/reps) were used for measuring flow with plain water and 12 separate sections (reps) of measurement (2 beds) were used to measure flow when the humate was injected. The treatments were:
 1. Water with humate
    a. Ultramate was applied at 3.0 lb/acre for the period of the test.
    b. This amount was divided into 6 weekly injections, with plain water applied between the injections as explained below.
 2. Plain water only
Flow Collection Method:

Six measurement points were identified on each bed, making 12 measurements for each treatment (2 beds per treatment). At each measurement site a 5-foot long split PVC pipe (1.5-inch PVC pipe cut lengthwise) was placed on an incline (FIG. 1) toward a cavity made in the bed that held a 16-oz. plastic collection cup. The pipe was placed in the same position (using a "stop") for each weekly collection. The stop ensured that the same length of tubing was measured each time to maximize the consistency among measurement dates.

Figure 2:
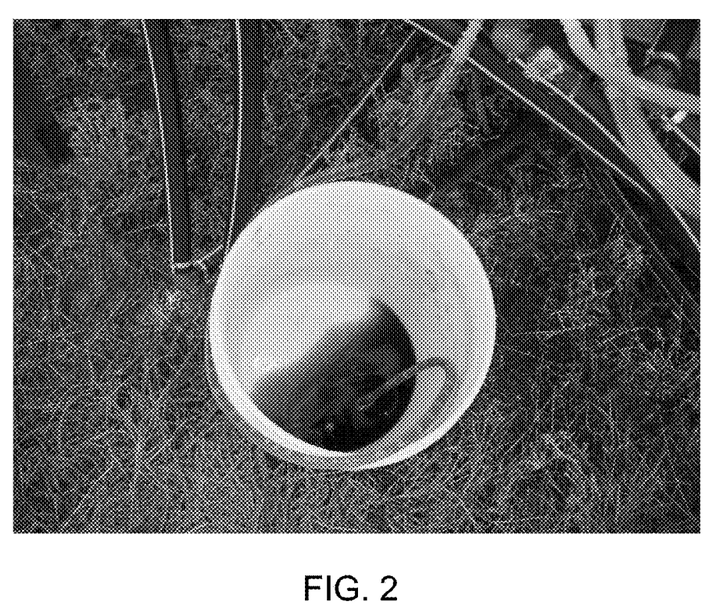
FIG. 2 is a photograph of a bucket with humate mixed with water and injected into the drip tape of FIG. 1.
Figure 3:
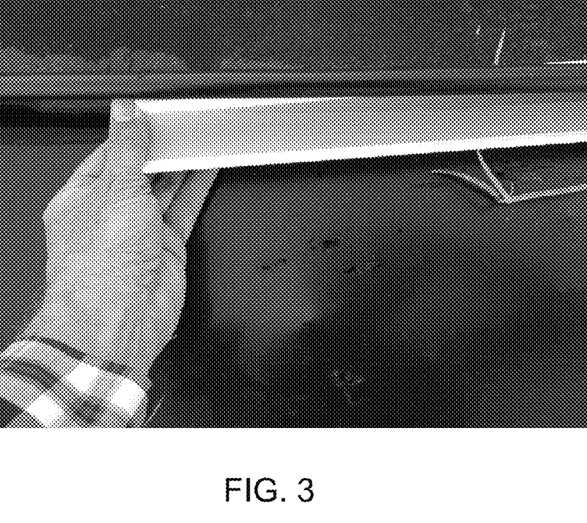
FIG. 3 is a photograph of liquid collected from the drip tape.

The first two collections were made before any humate was injected to obtain a base flow. These baseline measurements were made on Mar. 11, 2014. Two successive measurements were made on March 11 (average of 162 ml) of the base line flow in the tape before injecting the humate, and these measurements were averaged to provide the baseline flow. After the baseline collections were completed, the first humate injection was made (FIG. 2) on March 11. FIG. 2 shows humate mixed with water in a bucket and injected into the drip irrigation system with a peristaltic pump. The color of the applied water with the humate (as it flowed from the drip emitter) is shown in FIG. 3. This process of collection and injection was repeated 6 times over March and April. The injection was made over a period of 15 minutes followed by a 15-minute plain water period. This process mimicked the normal commercial-grower injection process of fertilizer injection followed by plain water flush.

During the days following the injection, the irrigation system was automatically operated with plain water for 30 minutes each day to mimic a commercial irrigation process. One week later another collection of water flow was made followed by the next injection of humate on the same day as the collection. After the last injection on April 18, an additional flow measurement was made on April 29, 11 days after the last injection.

The flow measurements were made by turning on the irrigation system and allowing it to reach pressure, about 12 psi. Flow collections were made for 60 seconds into a plastic collection cup. The net weight of water was determined on electronic scales in the field lab. Volume measurements confirmed that 1 ml water=1 gram.
Data Analysis:

All of the data collected was subjected to analysis of variance to test for presence of significant main effects (treatment and date) and interaction. Means were compared using the Fisher's Protected Least Significant Difference value (5% probability level).
Results:

The results are presented in two formats below, one for the actual flow measured in milliliters per 5-foot of tape, and the other in percent reduction in flow from the baseline measured flow (before injection of the humate). The percent reduction is the preferred result to focus on because there was a slight difference in the baseline flow measured among the tapes destined to receive the humate and the tapes for the plain water. Using percent reduction helps correct for these minor differences in starting flows. Part 1 summarizes the actual flow data and Part 2 summarizes the flows expressed as the percent of the starting baseline flow.
Part 1. Flow.

Figure 4:
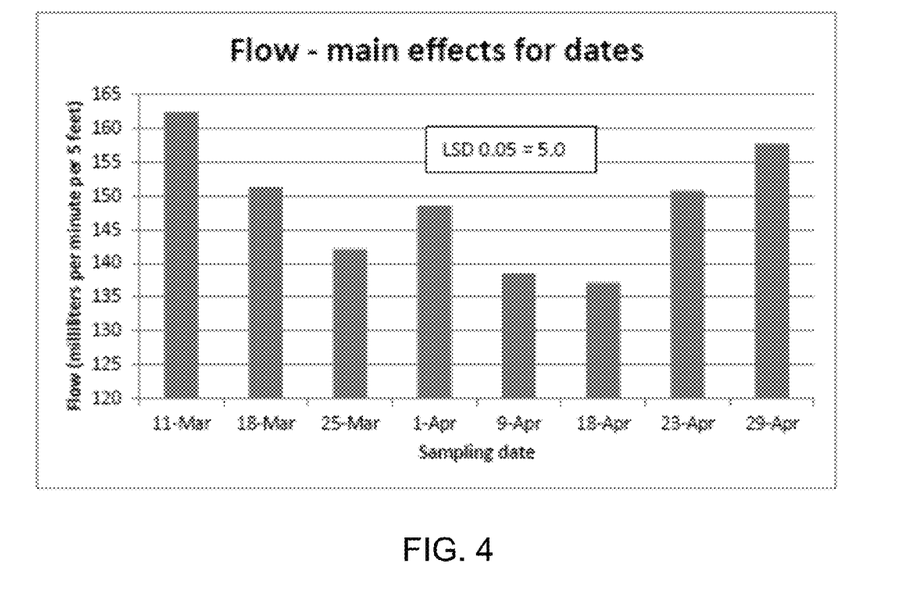
FIG. 4 is a graph of flow on various dates averaged over treatment and repetitions.
Figure 5:
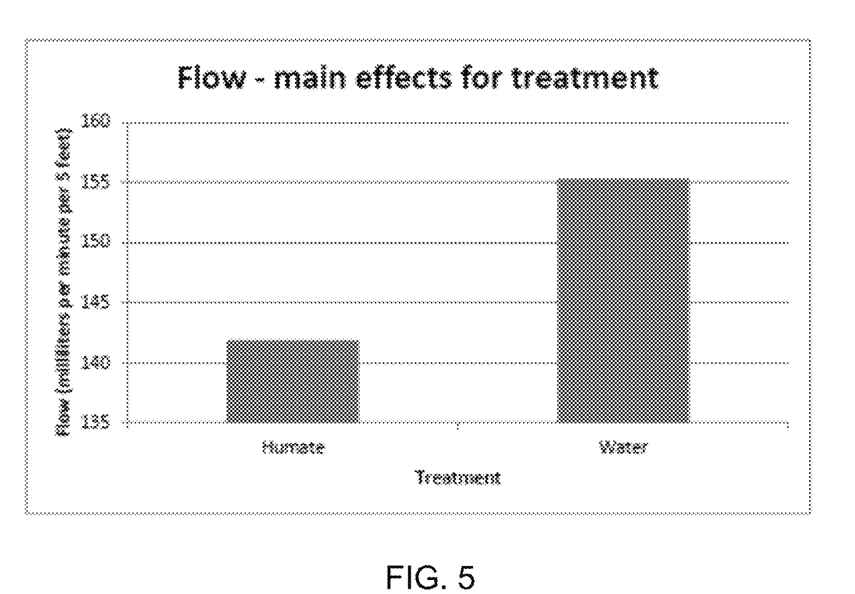
FIG. 5 is a graph of flow of humate and water.

Flow was affected by date and treatment, and by the interaction of date and treatment (Table 1). Flow dropped by 15% between the baseline date and the April 18 date (Table 2 and FIG. 4) although there were some variations in flow during this period. FIG. 4 is a graphical presentation of flow for dates averaged over treatment and reps. There were small but statistically significant drops in flow over time. The flow increased between April 18 and April 29 back to the baseline flow (Table 2 and FIG. 4). Flow with the humate, averaged over the season, was 8% less than for plain water (Table 3 and FIG. 5). FIG. 5. is a graphical presentation of flow for treatment averaged over dates and reps. These main effects give a general idea about the responses in flow due to date and treatment, but there was a significant interaction between treatment and measurement date (Table 1). This means that the difference between flow with humate and plain water depended on the date of measurement.

TABLE 1

Analysis of variance for flow in ml/5-ft of tape per minute.

| Source | DF | Anova SS | Mean Square | F Value | Pr > F |
|---|---|---|---|---|---|
| Date | 7 | 13584.13 | 1940.59 | 25.45 | <.0001 |
| Treat | 1 | 8627.766 | 8627.766 | 113.17 | <.0001 |
| Date*Treat | 7 | 1633.299 | 233.3284 | 3.06 | 0.0047 |
| Rep | 11 | 4984.703 | 453.1548 | 5.94 | <.0001 |
| Error | | | 76.24 | | |

TABLE 2

Means (averaged over treatment and rep) for flow for main effect of collection date. March 11 is the baseline collection date and first injection date. April 18 is last injection date.

| Collection date | N | Flow (mls) Mean |
|---|---|---|
| 11-Mar | 24 | 162 |
| 18-Mar | 24 | 151 |
| 25-Mar | 24 | 142 |
| 1-Apr | 24 | 149 |
| 9-Apr | 24 | 138 |
| 18-Apr | 24 | 137 |
| 23-Apr | 24 | 151 |
| 29-Apr | 24 | 158 |
| LSD 0.05 | | 5.0 |

TABLE 3

Main effects for flow for treatment averaged over dates and reps.

| Treat | N | Flow mls Mean |
|---|---|---|
| Humate | 96 | 142 |
| Water | 96 | 155 |
| F-test | | ** |

Figure 6:
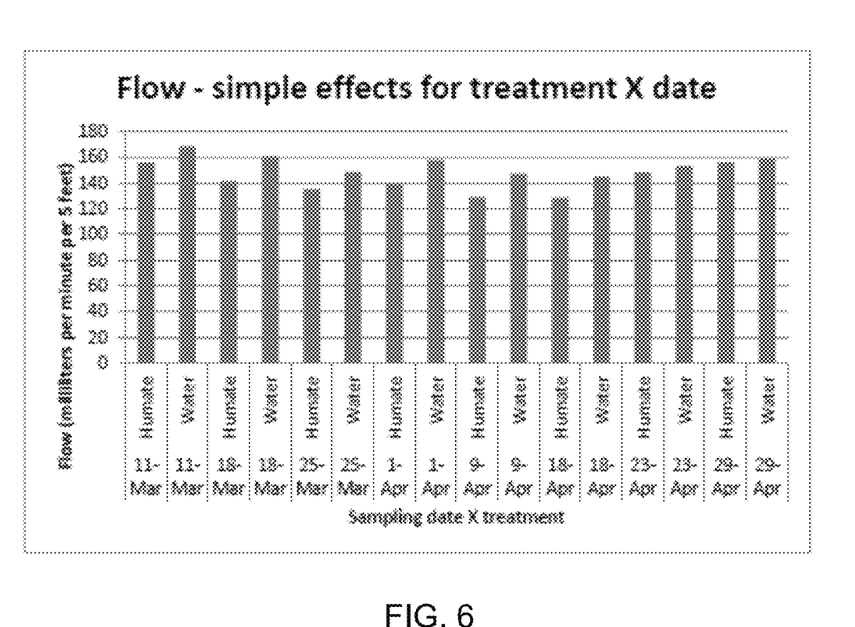
FIG. 6 is a graph of flow for humate and water by sample dates

The baseline measurements made on March 11 showed that there was a slight difference in the flow among the tapes even before the humate was injected (Table 4 and FIG. 6). FIG. 6 is a graphical representation of flow for the interaction of date and treatment. Over the collection period, flows were greater with the plain water treatment compared with the humate treatment until April 23 when the flows equalized.

TABLE 4

Simple effects for flow for the interaction of date and treatment, averaged over reps. Comparisons of means for humate versus water for any date are significant if the difference is greater than the LSD value.

| Date | Treat | N | Flow mls Mean |
|---|---|---|---|
| 11-Mar | Humate | 12 | 156 |
| 11-Mar | Water | 12 | 169 |
| 18-Mar | Humate | 12 | 142 |
| 18-Mar | Water | 12 | 161 |
| 25-Mar | Humate | 12 | 135 |
| 25-Mar | Water | 12 | 149 |
| 1-Apr | Humate | 12 | 139 |

TABLE 4-continued

Simple effects for flow for the interaction of date and treatment, averaged over reps. Comparisons of means for humate versus water for any date are significant if the difference is greater than the LSD value.

| Date | Treat | N | Flow mls Mean |
|---|---|---|---|
| 1-Apr | Water | 12 | 158 |
| 9-Apr | Humate | 12 | 129 |
| 9-Apr | Water | 12 | 148 |
| 18-Apr | Humate | 12 | 129 |
| 18-Apr | Water | 12 | 145 |
| 23-Apr | Humate | 12 | 148 |
| 23-Apr | Water | 12 | 153 |
| 29-Apr | Humate | 12 | 156 |
| 29-Apr | Water | 12 | 159 |
| LSD 0.05 | | | 7 |

These responses for direct-measured flow are presented to provide an idea of the flow rates experienced in this test and should be used with caution for comparing treatments. This is because of the slight difference in baseline flows between the drip tapes used for humate and plain water treatments. This probably illustrates the minor inherent variability in flows along a length of drip tape. A better way to compare true treatment effects in this study is to use the percent reduction in flow (from baseline). The analyses of variance for those data are presented in Part 2 below.

Figure 7:
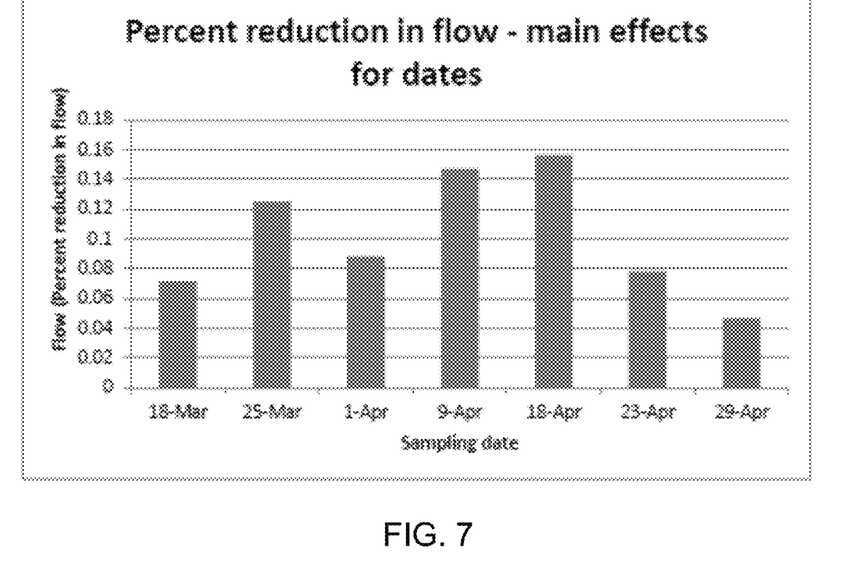
FIG. 7 is a graph of present reduction in flow by date
Figure 8:
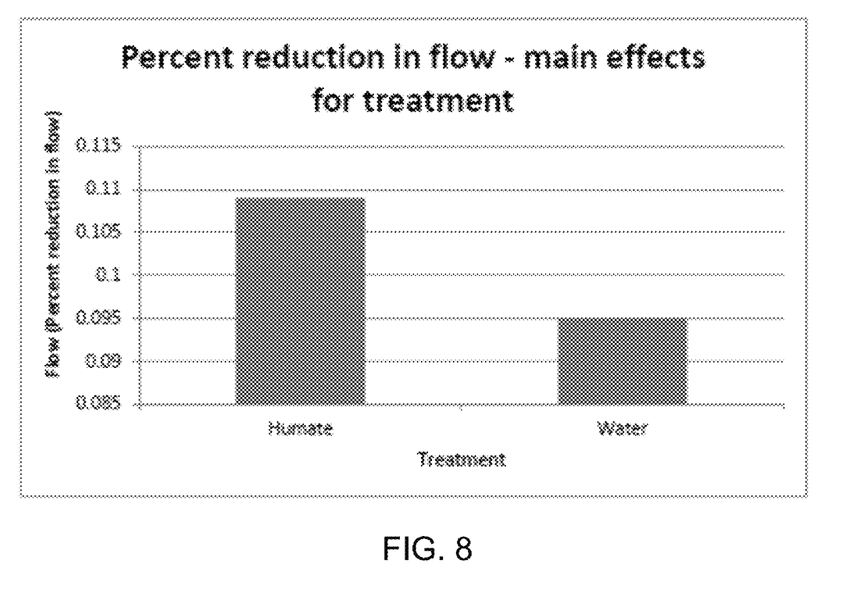
FIG. 8 is a graph of present reduction in flow from baseline for treatment.

Part 2. Percent Flow Reduction:

The percent flow reduction variable was calculated by subtracting the flow on a sampling date from the baseline flow and dividing by the baseline flow, creating the percent flow reduction (from baseline) on a given sampling date. In this analysis, date of measurement and treatment (humate vs plain water) were significant (Table 5). The interaction was also significant. This interaction means that the comparison of humate versus water provided different results depending on the date. The main effects for date and for treatment are presented in Tables 6 and 7 and FIGS. 7 and 8. FIG. 7 is a graphical presentation of percent reduction (×100) in flow from baseline for sampling dates. FIG. 5 is a graphical presentation of percent reduction in flow from baseline treatment.

TABLE 5

Analysis of variance for percent reduction from baseline flow.

| Source | DF | Anova SS | Mean Square | F Value | Pr > F |
|---|---|---|---|---|---|
| Date | 6 | 0.247855 | 0.041309 | 20.99 | <.0001 |
| Treat | 1 | 0.008361 | 0.008361 | 4.25 | 0.0411 |
| Date*Treat | 6 | 0.052752 | 0.008792 | 4.47 | 0.0004 |
| Rep | 11 | 0.048127 | 0.004375 | 2.22 | 0.0162 |
| Error | | | 0.00197 | | |

TABLE 6

Main effects for date for percent reduction in flow from baseline.

| Date | N | Mean percent reduction from baseline (×100) |
|---|---|---|
| 18-Mar | 24 | 0.07 |
| 25-Mar | 24 | 0.13 |

TABLE 6-continued

Main effects for date for percent reduction in flow from baseline.

| Date | N | Mean percent reduction from baseline (×100) |
|---|---|---|
| 1-Apr | 24 | 0.09 |
| 9-Apr | 24 | 0.15 |
| 18-Apr | 24 | 0.16 |
| 23-Apr | 24 | 0.08 |
| 29-Apr | 24 | 0.05 |
| LSD 0.05 | | 0.026 |

TABLE 7

Main effects for treatment for percent reduction in flow from baseline.

| Treat | N | Percent reduction (×100) Mean |
|---|---|---|
| Humate | 84 | 0.11 |
| Water | 84 | 0.10 |
| F-test | | * |

Figure 9:
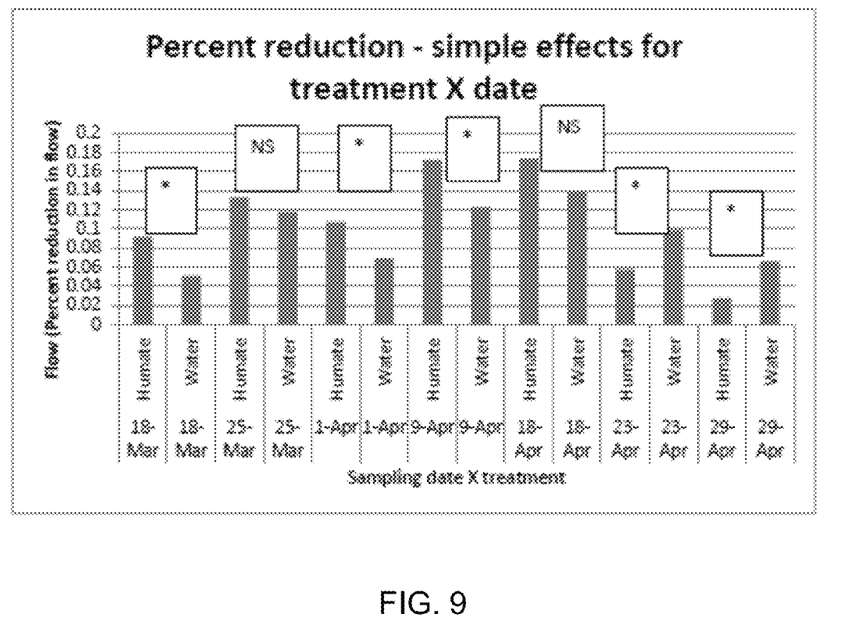
FIG. 9 is a graph of the simple effects for percent reduction if flow from baseline for the interaction of date and treatment.

Using the percent reduction variable (Table 8 and FIG. 9) showed that on several dates of measurement, humate injection resulted in a slight but significant reduction in flow from baseline. FIG. 9. graphically shows the simple effects for percent reduction in flow from baseline for the interaction of date and treatment. Comparisons for March 18, April 1, April 9, April 23, and April 29 are significant. However this reduction was not observed on all dates. For example, on March 25 and April 18, there were no differences in flow reduction between plain water and humate. Further, with time, the flow was greater with humate compared with plain water (April 23 and 29). This result seems to imply that humate injection slightly reduced flow soon after commencing injection but that eventually the reduction in flow corrected itself.

TABLE 8

Simple effects for percent reduction in flow from baseline for the interaction of date and treatment. The asterisk (*) or NS refers to whether the comparison between humate and plain water for a specific date, was significant (*) or not (NS).

| Date | Treat | N | percent reduction (×100) Mean |
|---|---|---|---|
| 18-Mar | Humate | 12 | 0.09 |
| 18-Mar | Water | 12 | 0.05* |
| 25-Mar | Humate | 12 | 0.13 |
| 25-Mar | Water | 12 | 0.12 NS |
| 1-Apr | Humate | 12 | 0.11 |
| 1-Apr | Water | 12 | 0.07* |
| 9-Apr | Humate | 12 | 0.17 |
| 9-Apr | Water | 12 | 0.12* |
| 18-Apr | Humate | 12 | 0.17 |
| 18-Apr | Water | 12 | 0.14 NS |
| 23-Apr | Humate | 12 | 0.06 |
| 23-Apr | Water | 12 | 0.10* |
| 29-Apr | Humate | 12 | 0.03 |

TABLE 8-continued

Simple effects for percent reduction in flow from baseline for the interaction of date and treatment. The asterisk (*) or NS refers to whether the comparison between humate and plain water for a specific date, was significant (*) or not (NS).

| Date | Treat | N | percent reduction (×100) Mean |
|---|---|---|---|
| 29-Apr | Water | 12 | 0.07* |
| LSD 0.05 | | | 0.036 |

Reduction in flow seemed to increase with both treatments over time, perhaps as a result of lime deposits in the tape from the well water. The reduction was slightly more so with humate early in the period. However flow increased after the last humate injection. It is noted that the humate may change the water chemistry over time such that lime deposits are decreased. Overall conclusions:

There does not seem to be a serious potential for clogging with embodiments of the humate product. Cut open drip tape after the injections were completed; showed that there was a small amount of organic residue inside the tape near the labyrinth. Repeating the experiment using lower pressure (10 psi) on the system appeared to lessen the organic residue.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process of formulating a sulfonated potassium humate powder in granular form, said process comprising:
    metering of a lignin or lignosulfonate into a powder of sulfonated potassium humate to allow for granulation without solubilizing said powder by matching a lignin particle size or lignosulfonate particle size to a particle size of said powder; and
    mixing said lignin or lignosulfonate and said powder to the granular form with a granule size of 0.1 to 6 millimeters.

2. The process of claim 1 further comprising reacting humic acid and fulvic acid to form a granulized sulfonated humate having a sulfonic sulfur content greater than about 5% by total weight.

3. The process of claim 1 wherein said sulfonated potassium humate powder in granular form is formed in a shugi mixer.

4. The process of claim 1 further comprising a flash drying or compaction process.

5. The process of claim 4 wherein a range of densities of said sulfonated potassium humate powder in granular form is achieved by the flash drying to produce a porous, low density sulfonated potassium humate granule, or the compaction process is used to form a higher density granules within the range.

* * * * *